United States Patent
Kumakura

[11] Patent Number: 6,095,938
[45] Date of Patent: Aug. 1, 2000

[54] PLATE BASE OF GUIDE FOR CHAIN DRIVE

[75] Inventor: Atsushi Kumakura, Iruma, Japan

[73] Assignee: Tsubakimoto Chain Co., Osaka, Japan

[21] Appl. No.: 08/929,816

[22] Filed: Sep. 15, 1997

[30] Foreign Application Priority Data

Sep. 17, 1996 [JP] Japan ................................ 8-244739

[51] Int. Cl.⁷ ................ I16H 7/08; B26D 1/12; B23C 1/00
[52] U.S. Cl. ............... 474/111; 474/140; 29/54; 83/692
[58] Field of Search ................. 474/111, 110, 474/140, 101, 109, 147, 145; 83/692, 693, 682, 581, 875, 917; 29/54; 428/43, 156, 597; 52/653.1

[56] References Cited

U.S. PATENT DOCUMENTS

| | | | |
|---|---|---|---|
| 3,276,282 | 10/1966 | Duncan | 474/111 |
| 3,455,196 | 7/1969 | Kreider | 83/917 |
| 4,826,468 | 5/1989 | Friedrichs | 474/111 X |
| 4,832,664 | 5/1989 | Groger et al. | 474/140 |
| 4,921,472 | 5/1990 | Young | 474/111 |
| 5,045,032 | 9/1991 | Suzuki et al. | 474/140 |
| 5,318,482 | 6/1994 | Sato et al. | 474/111 |
| 5,692,353 | 12/1997 | Bass et al. | 52/653.1 |

FOREIGN PATENT DOCUMENTS

| | | |
|---|---|---|
| 2320546 | 6/1998 | United Kingdom . |
| WO9733104 | 9/1997 | WIPO . |

Primary Examiner—Tamara L. Graysay
Assistant Examiner—Marcus Charles
Attorney, Agent, or Firm—Dann, Dorfman, Herrell & Skillman, P.C.; Henry H. Skillman

[57] ABSTRACT

A fixed chain guide for absorbing vibrations during running of a chain is composed of a shoe in sliding contact with the chain and a plate base supporting the shoe. The plate base is secured to a mounting surface by two mounting seats integral with the base plate. The mounting seats are formed by bending them in opposite directions along bend lines, to have the seats in an essentially common plane but extending in opposite directions from the bottom edge of the base plate. The base plate is punched out of sheet stock in such a way that failure will not occur at the respective bend lines of the mounting seat by forming the ends of the bend lines so that there is a shear surface on the outside of the bend and a rupture surface on the inside of the bend. Punching the stock originally produces a shear surface adjacent one surface of the stock at the ends of one of the bend lines and a rupture surface adjacent the other side of the stock. The other of the bend lines is punched out at the ends by counterpunching from the opposite side of the plate base from the original punching to reverse the shear and rupture surfaces.

6 Claims, 5 Drawing Sheets

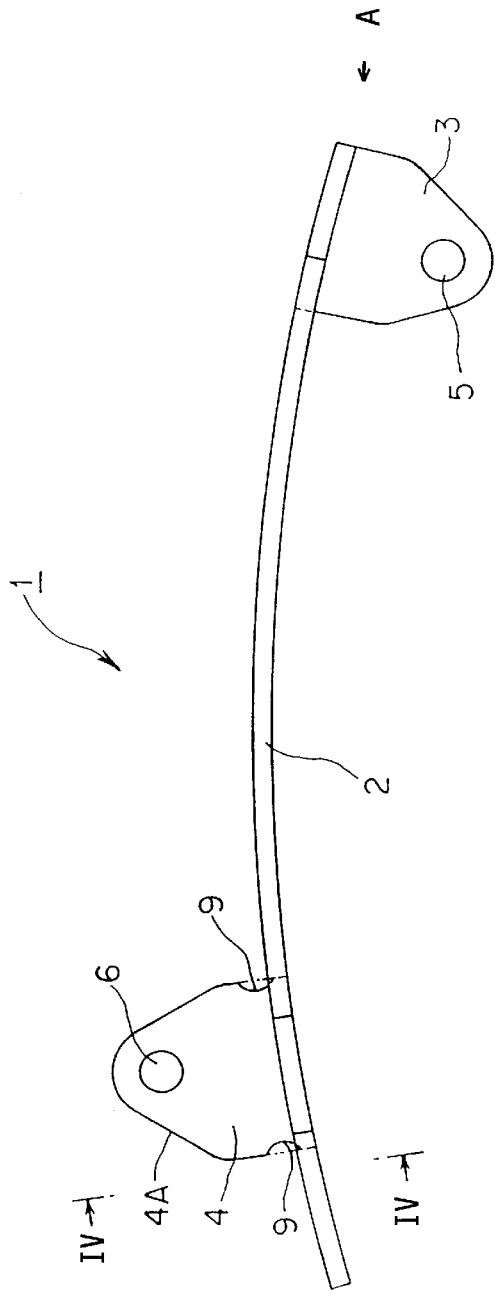
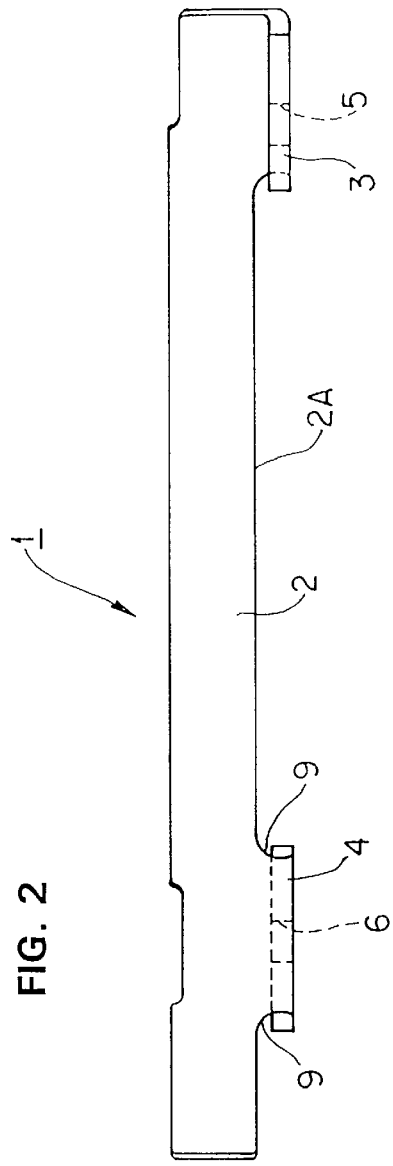

PLATE BASE OF GUIDE FOR CHAIN DRIVE

FIELD OF THE INVENTION

The present invention relates to a plate base of a guide for a chain drive.

BACKGROUND OF THE INVENTION

In the conventional chain drive used to transmit rotation of a crank shaft of an engine to a cam shaft, as shown in FIG. 6, a chain 17 is passed over between a drive sprocket 12 secured to a crank shaft 11 and driven sprockets 15, 16 secured to cam shafts 13, 14, respectively. A tensioner lever 20 is supported pivotally around a support shaft 18 secured on the engine side and biased toward the chain 17 by means of a tensioner 19. The tensioner lever 20 is arranged along the outer periphery of the chain 17 between the drive sprocket 12 and the driven sprocket 15. The chain 17 is pressed from the side by a shoe 21 of the tensioner lever 20 to prevent looseness thereof and vibrations during running.

Further, a fixed chain guide 22 for preventing vibrations during running of the chain 17 is arranged along the outer periphery of the chain 17 between the drive sprocket 12 and the driven sprocket 16.

The fixed chain guide 22 is composed of a shoe 23 in sliding contact with the chain 17 and a plate base 24 mounted on the shoe 23, and the plate base 24 is secured to a mounting surface on the engine side by two mounting seats 25, 26 which extend for less than one-fourth of the length of the plate base 24 adjacent opposite ends of the base. Between the seats 25 and 26, the base is bowed outwardly to guide the chain 17 in a longitudinal direction.

In the process of manufacturing the plate base of the chain guide described above, a metal plate stock is externally punched. Punching shears the plate stock to produce a longitudinal edge having a shear surface facing the punch and a rupture surface on the opposite surface. After punching, the mounting seats are subjected to bending approximately perpendicular to the plate base. However, in the case where two mounting seats are bent oppositely to each other with respect to the longitudinal direction of the plate base, as shown in FIG. 6, in both edges of the bent portion of one mounting seat, the rupture surface caused by the external punching is positioned externally in the bending direction. Therefore, cracks sometimes occurred externally in the bending direction, during the bending of the mounting seats, resulting from fine cracks included in the rupture surface.

Further, since the chain guide is incorporated into a narrow space internally of the engine, when a height h from the bottom of the mounting seat 25 (26) to a bottom edge 24B of a shoe support portion 24A of the plate base 24 is low, as shown in FIG. 7, an escape internally in the bending direction disappears when the mounting seats 25, 26 are subjected to bending, posing a problem in that cracks occur in the bend portion and the accuracy of the bend is reduced.

On the other hand, a proposal has been made to solve the above problem by an arrangement wherein for securing the aforementioned escape, a slit-like escape portion G is formed from both end edges widthwise of mounting seat 25' (26') to a shoe support portion 24'A of a plate base 24', as shown in FIG. 8, after which bending is carried out. In this proposal, however, stress tends to be concentrated on the escape portion G entered in the shoe support portion 24' to lower the strength of the plate base 24', posing a practical problem.

SUMMARY OF THE INVENTION

It is therefore an object of the present invention to solve the problems noted above with respect to prior art and provide a plate base of a guide for a chain drive which is free from occurrence of cracks in both edges of a bend portion when bending, and which can be manufactured compactly without lowering accuracy and strength.

For achieving the aforesaid object, according to the present invention, first, there is provided a plate base in which a bottom edge of a shoe support portion on which a shoe in sliding contact with a chain is mounted has mounting seats connected sideways through a bend line parallel with the bottom edge, wherein both end portions of the bend line which otherwise would have a rupture surface (caused by external punching of a metal plate stock) external in a bending direction, are subjected to a secondary punching before forming the bend portion, producing a shear surface externally in a bending direction.

Further, according to the present invention, there is provided in a plate base in which a bottom edge of a shoe support portion on which a shoe in sliding contact with a chain is mounted has mounting seats connected sideways through bend lines parallel with the bottom edge of the plate base, wherein a substantially semicircular or U-shaped escape portion is formed inwardly from both ends of the bend line.

Further, according to the present invention, there is provided in a plate base of a guide for a chain drive in which a shoe support portion on which a shoe in sliding contact with a chain is mounted, has a longitudinal edge and mounting seats connected sideways through bend lines parallel with the longitudinal edge, characterized in that a substantially semicircular or U-shaped escape portion is formed before forming the bend portion by a secondary punching producing a shear surface externally in a bending direction inwardly from both ends of the bend line in which a rupture surface side caused by external punching of a metal plate stock is external in a bending direction.

In the first plate base of a guide for a chain drive according to the present invention, both end portions of the bend line have a smooth shear surface externally in a bending direction thereof by the secondary punching. Therefore, even if the bending radius is made small when bending, no crack occurs. Further, in the second plate base of a guide for a chain drive according to the present invention, a substantially semicircular or U-shaped escape portion is formed inwardly from both end portions of the bend line. Therefore, it is possible to prevent an occurrence of crack caused by stress concentrated on the bend line during bending and accuracy from lowering. Further, the strength of the shoe support portion of the plate base caused by formation of an escape portion is not lowered.

In the third plate base of a guide for a chain drive according to the present invention, a substantially semicircular or U-shaped escape portion is formed before bending by a secondary punching producing a shear surface externally in a bending direction inwardly from both edge portions of the bend portion. Therefore, even if the bending radius is made small when bending, no crack occurs, and accuracy is not lowered. Further, the strength of the shoe support portion of the plate base caused by formation of an escape portion is not lowered.

BRIEF DESCRIPTION OF THE DRAWINGS

All of the objects of the present invention are more fully set forth hereinafter with reference to the accompanying drawings, wherein:

FIG. 1 is a plan view of a plate base of a guide for a chain drive showing an embodiment of the present invention;

FIG. 2 is a side view showing an embodiment of a plate base of a guide for a chain drive according to the present invention;

DETAILED DESCRIPTION OF THE PREFERRED EMBODIMENTS

As illustrated in FIGS. 1–4, a plate base 1 has a shoe support portion 2 on which a shoe (not shown) is mounted, and mounting seats 3, 4 integral with the shoe support portion 2 and connected sideways through imaginary bend lines 7 and 8 parallel with a longitudinal bottom edge 2A of the shoe support portion 2. The mounting seats 3, 4 have bolt holes 5, 6 for securing the plate base to a side of the engine, and are bent in the direction opposite to each other from the shoe support portion 2.

Figure 3:
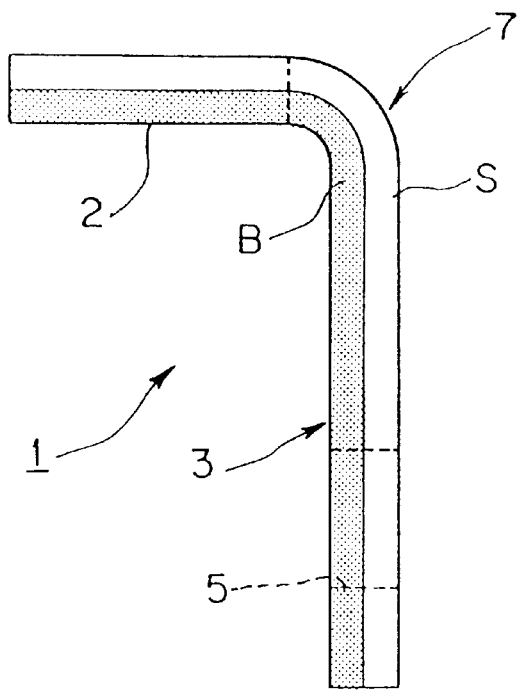
FIG. 3 shows one mounting seat as viewed in the direction A of FIG. 1.
Figure 4:
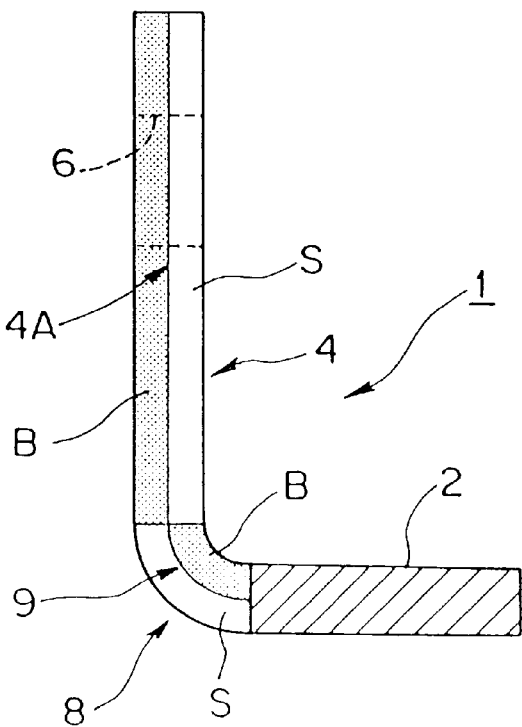
FIG. 4 shows the other mounting seat 4 as viewed from line IV—IV of FIG. 1.

As shown in FIGS. 3 and 4, when the base support portion 2 is punched out, a shear surface S is formed externally in a bending direction at both side edge portions at the ends of a bend line 7, and a rupture surface B is positioned internally. The shear surface S and the rupture surface B are produced when an external contour of the plate base 1 is punched from a metal plate stock. Even if the bend line 7 is subjected to bending immediately after the punching, the mounting seat 3 involves no problem of occurrence of crack because the surface externally in a bending direction on which tensile stress acts when bending is a smooth shear surface S.

On the other hand, FIG. 4 shows the other mounting seat 4 as viewed from the direction of arrow in a position of line B—B of FIG. 1. A rupture surface B is formed externally in a bending direction of a bend line 8 in a side edge 4A of the mounting seat 4 at the end of the bend line, and a shear surface S is formed internally, but only an escape portion 9 forming both end portions of the bend line 8 is formed with a shear surface S externally in a bending direction similar to the surfaces at the ends of the bend line 7 of the mounting seat 3 as mentioned above.

Figure 5A:
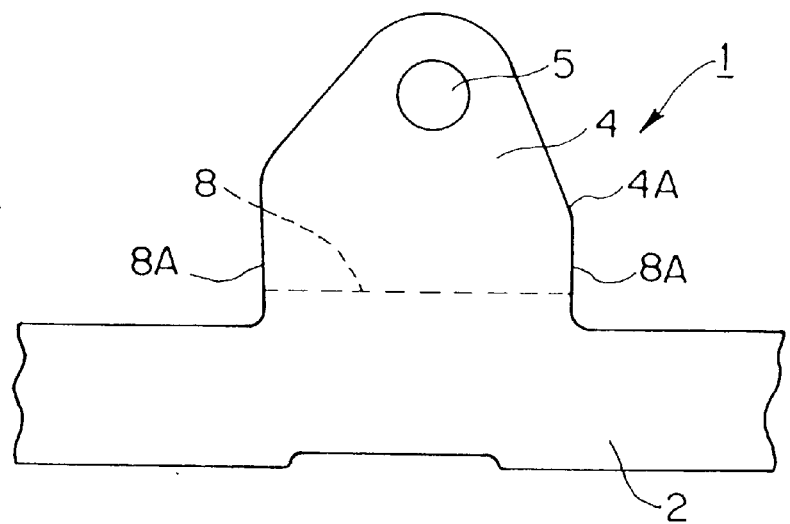
FIG. 5 is a composite view showing the process for manufacturing a plate base of a guide for a chain drive of the present invention, FIG. 5A showing a state immediately after a contour was punched from a metal plate stock, FIG. 5B showing a state immediately after secondary punching, and FIG. 5C being a state in which bending has been completed.

FIG. 5 shows the process for forming the bend line 8. FIG. 5A is a partial view showing the state immediately after an external contour of the plate base 1 is punched from a metal plate stock. Immediately after punching, the mounting seat 4 is developed. The shear surface S and the rupture surface B formed in the side edge 4A of the mounting seat are also continuously formed in both edge portions 8A widthwise of a position to the bend line 8 without modification.

Incidentally, if the mounting seat is subjected to bending along the bend line 8 without modification, the rupture surface B is positioned externally in a bending direction in FIG. 4 in the both ends 8A. Therefore, the fine cracks which are present in the rupture surface B are likely developed into large cracks.

Figure 5B:
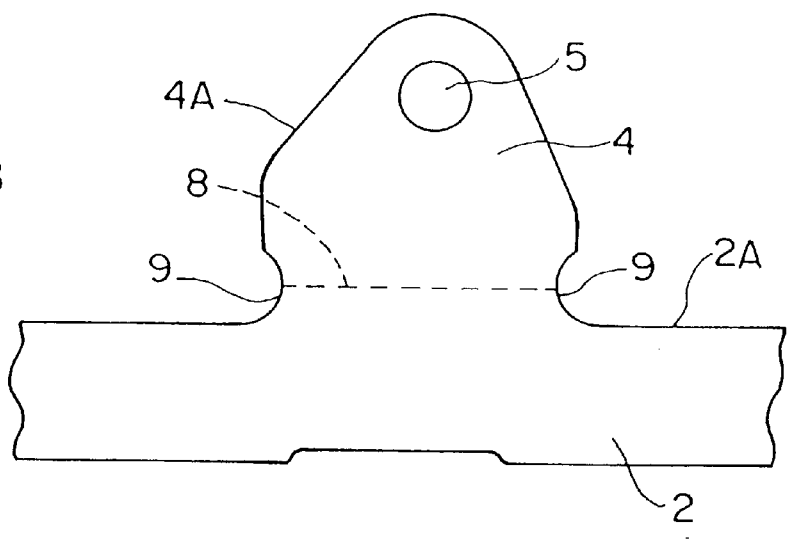
Figure 5C:
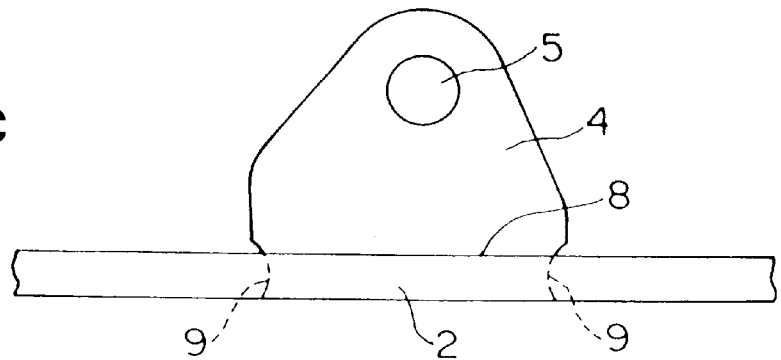
Figure 6:
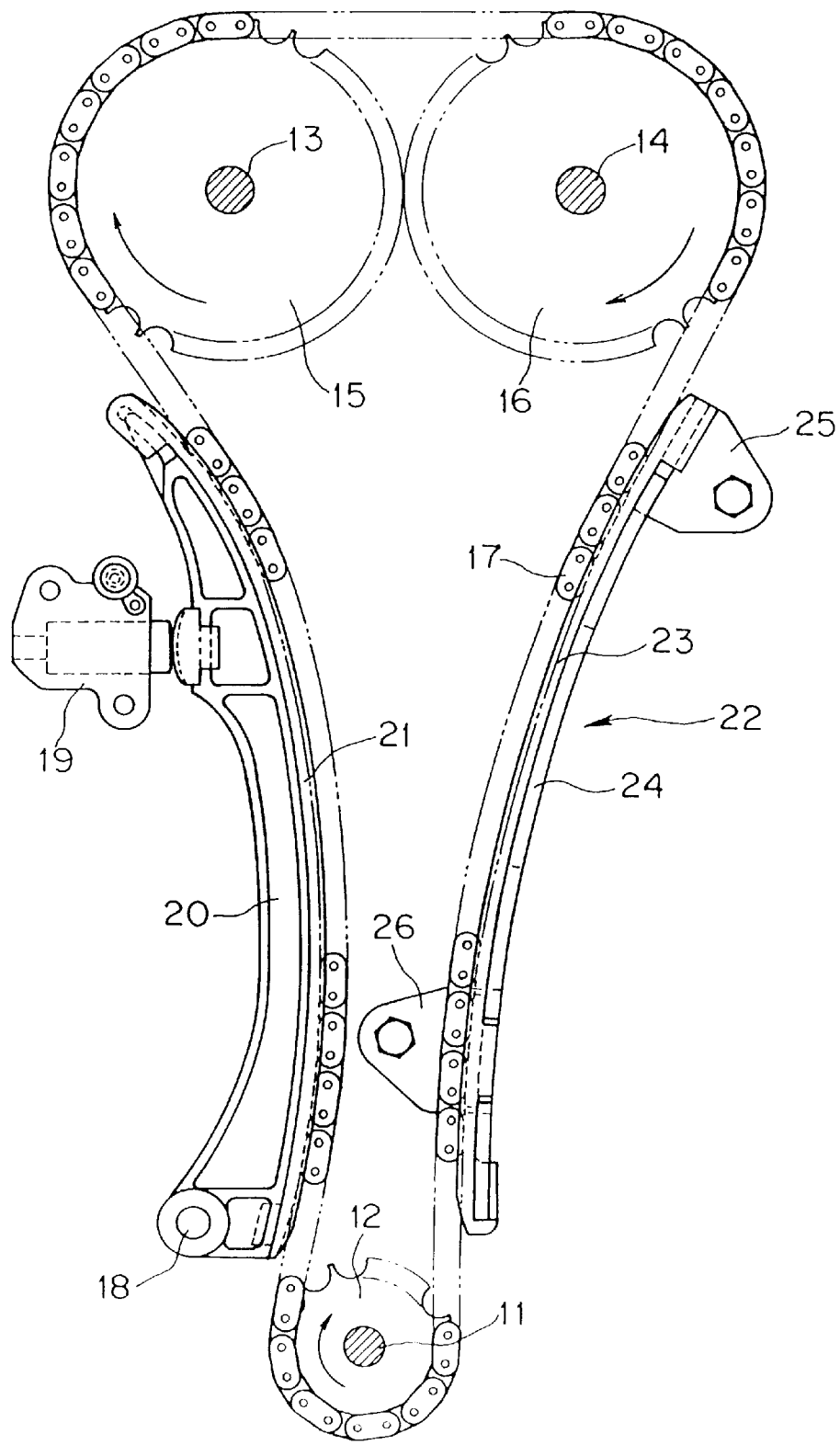
FIG. 6 is a plan view showing one example of a prior art chain drive in which a conventional chain guide is used.
Figure 7:
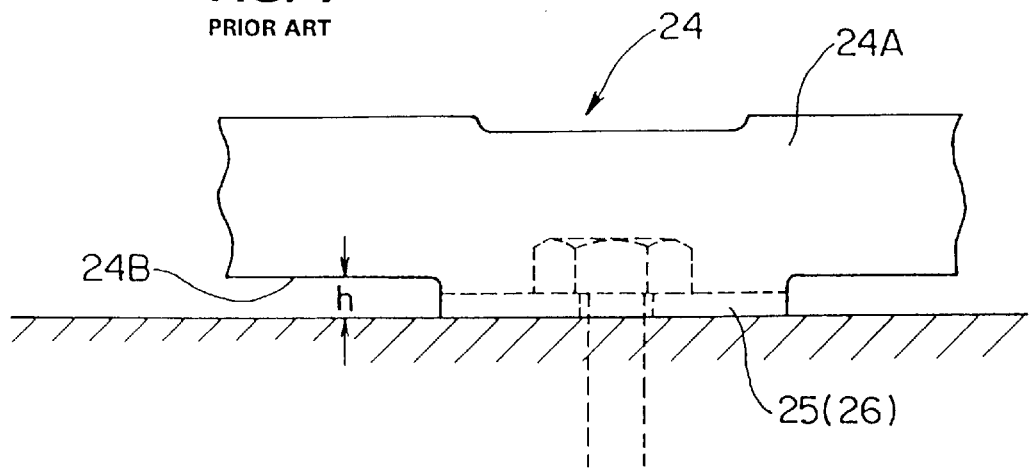
FIG. 7 is a partial side view showing one example of a bend portion of a conventional prior art plate base.
Figure 8:
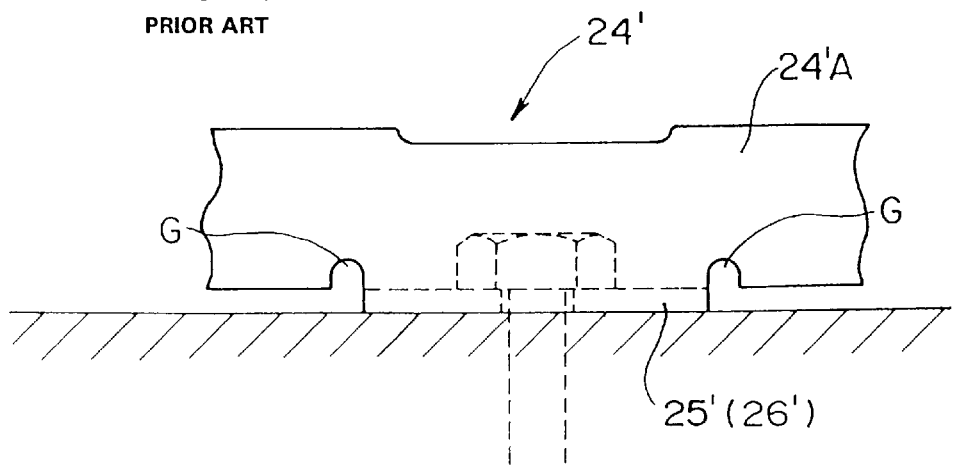
FIG. 8 is a partial side view showing another example of a bend portion of a conventional prior art plate base.

Thus, as shown in FIG. 5B, both edge portions widthwise of a position to be the bend portion 8 are subjected to secondary punching by which the shear surface and the rupture surface are formed reversely to the contiguous surfaces of the side edge 4A of the mounting seat 4 to provide a pair of substantially semicircular or U-shaped escape portions 9, after which as shown in FIG. 5C, the bend line 8 is bent so that after bending, the shoe support portion 2 is at right angles to the mounting seat 4.

At this time, the stress acting on both edge portions at the ends of the bend line 8 is dispersed by the escape portion 9 to prevent cracks from occurring and to facilitate bending in a position closest to the bottom edge 2A of the shoe support portion 2. While in the aforementioned embodiment, the escape portions 9 are processed only at both edge portions of the bend portion 8 of the mounting seat 4, it is to be noted that escape portion similar to the bend portion 8 may be processed also in both edge portions of the bend portion 7 of the mounting seat 3 shown in FIG. 3 in order to prevent stress concentration when bending takes place and facilitate bending.

If both edge portions of the bend portion in which a rupture surface side produced at the time of contour punching from a metal plate stock is external in a bending direction are subjected to secondary punching by which a shear surface is produced externally in a bending direction, though the performance is somewhat lowered as compared with the previous embodiment, it is possible to make occurrence of crack difficult even if the escape portion having the shape as described above is not provided. This is the case where for example, both edge portions of the bend portion and the external contour of the mounting seat are simultaneously formed by secondary punching.

In the case where a substantially semicircular or U-shaped escape portion as mentioned above is provided, even if the escape portion is punched so that the external portion in a bending direction is a rupture surface, the stress concentration of the bend portion on the both edge portions during bending is relieved. Therefore, it is possible to make occurrence of cracks difficult during bending.

Further, in the case where the escape portion is formed by cutting or grinding instead of punching, a rupture surface of an external portion in a bending direction of both end portions of the bend line is smoothly finished similar to one in which the escape portion is subjected to secondary punching so that the external portion in a bending direction is a shear surface. Therefore, the performance equal to that of the previous embodiment can be obtained.

As described above, in a plate base of a guide for a chain drive according to the invention of claim 1, both edge portions of the bend portion in which a rupture surface side caused by external punching of a metal plate stock is external in a bending direction are subjected to a secondary punching producing a shear surface externally in a bending direction before forming the bend portion. Therefore, it is possible to prevent cracks from occurring on both end portions of the bend line during bending, and the bending radius can be reduced. As a result, it is possible to freely select the bending direction of the mounting seat so as to be able to correspond to a narrow mounting space within the engine or the like, and the plate base can be manufactured compactly.

Further, in a plate base of a guide for a chain drive according to the invention of claim 2, a substantially semicircular or U-shaped escape portion is formed inwardly from both end portions of the bend line. Therefore, it is possible to prevent occurrence of crack and lowering of accuracy caused by stress concentration of the bend line on both end portions during bending. Further, the strength of the shoe support portion of the plate base is not lowered even by the formation of the escape portion. Further, since the bend line can be provided closest to the bottom longitudinal edge of the shoe support portion, the plate base can be manufactured compactly so as to be able to correspond to a narrow mounting space within the engine or the like.

Further, in a plate base of a guide for a chain drive according to the invention, a substantially semicircular or U-shaped escape portion is formed before forming the bend line by a secondary punching producing a shear surface externally in a bending direction inwardly from both edge portions of the bend portion. Therefore, even if the bending radius is made small when bending takes place, no crack occurs, and the accuracy is not reduced. Further, the strength of the shoe support portion of the plate base is not impaired even by the formation of the escape portion. Further, since the bend line can be provided closest to the bottom edge of the shoe support portion, it is possible to freely select a bending direction of the mounting seat so as to be able to correspond to a narrow mounting space within the engine or the like. The plate base can be manufactured compactly.

While a particular embodiment of the invention has been herein illustrated and described, it is not intended to limit the invention to such disclosures, but changes and modifications may be made therein and thereto within the scope of the following claims.

I claim:

1. A support for the shoe of a guide for a chain drive comprising a base plate adapted to underlie the shoe, said base plate being formed of punched-out metal plate stock having spaced parallel longitudinal edges for supporting the shoe therealong, and a pair of mounting seats connected to one of said longitudinal edges by bend lines parallel to said one longitudinal edge, said longitudinal edge having a shear surface on one surface and a rupture surface on the opposite surface as a result of being punched-out by a punch passing in a given direction from the shear surface of said edge beyond the rupture surface of said edge, one of said pair of seats being bent along its associated bend line in a direction away from said shear surface of said one longitudinal edge, and the other of said seats being bent along its associated bend line in a direction away from said rupture surface of said one longitudinal edge, the bend line of said other seat comprising an end edge positioned between said other seat and said one longitudinal edge, said end edge having a shear surface contiguous to the rupture surface of said one longitudinal edge of the base plate and a rupture surface contiguous to the shear surface of said one longitudinal edge of the plate, produced by a punch passing in a direction opposite to said given direction to thereby produce a different shear and rupture surfaces at the opposite ends of said bend line.

2. A support according to claim 1 wherein each bend line of one of said pair of seats extends a distance along said longitudinal edge, said bend lines being adjacent opposite ends of said base plate, said base plate being bowed outwardly between said seats.

3. A support according to claim 1, the sheared edges of the bend line of said other seat comprising U-shaped escape portions punched out of said other seat at the opposite ends of its bend line.

4. A method of forming a support for the shoe of a guide for a chain drive, comprising the steps of punching out an elongated base having spaced parallel longitudinal edges adapted to support a shoe therealong, at least one of said edges being produced by a punch passing in a given direction past the edge, thereby producing a shear surface along said edge on the surface first engaged by said punch and a rupture surface on the opposite surface along said edge, said one edge being interrupted by outwardly projecting first and second mounting seats connected to said plate by an imaginary bend line parallel to said edge, treating the ends of the imaginary bend line of said second mounting seat to produce different surface characteristics contiguous to the rupture surface of said longitudinal edge and to the shear surface of said longitudinal edge, bending the first of said seats along its imaginary bend line in a direction away from the shear surface of said longitudinal edge, and bending the second of said seats along its imaginary bend line in a direction away from the rupture surfaces of said longitudinal edge.

5. A method according to claim 4 wherein said step of treating the ends of the imaginary bending line of said second mounting seat comprises shearing said second mounting seat by a punch passing in a direction opposite to aid given direction at the ends of said imaginary bending line, thereby producing said shear surface contiguous to the rupture surface of the longitudinal edge.

6. A method according to claim 4 wherein the step of treating the end of the imaginary bending line of said second seat comprises forming U-shaped escape portions at the opposite ends of said bend line, said escape portions interrupting the shear and rupture surfaces formed by said plate base being punched out of a metal plate stock.

* * * * *